United States Patent [19]

Jacob

[11] 3,754,100

[45] Aug. 21, 1973

[54] MULTI-STAGE TIME CONNECTION NETWORK ARRANGEMENT ADAPTED TO BE USED MORE PARTICULARLY IN TELEPHONE SWITCHING

[75] Inventor: Jean-Baptiste Jacob, Saint-Quay Perros, France

[73] Assignees: C.I.T.-Compagnie Industrielle Des Telecommunications, Paris; Societe Lannionnaise D'Electronique, Route de Perros-Quirec, Lannion, France

[21] Appl. No.: 39,786

[30] Foreign Application Priority Data

May 22, 1969 France .............................. 6916790

[52] U.S. Cl. .............................................. 179/15 AQ

[51] Int. Cl. .............................................. H04j 3/04

[58] Field of Search .................. 179/15 AT, 15 AQ, 179/15 AL

[56] References Cited

UNITED STATES PATENTS

| | | | |
|---|---|---|---|
| 3,573,381 | 4/1971 | Marcus | 179/15 AQ |
| 3,129,407 | 4/1964 | Paull | 179/15 AQ |
| 3,446,917 | 5/1969 | Inose | 179/15 AQ |
| 3,458,658 | 7/1969 | Aro | 179/15 AQ |

*Primary Examiner*—Ralph D. Blakeslee
*Attorney*—Craig, Antonelli and Hill

[57] ABSTRACT

A time connection network comprises a structure consisting of several stages comprising at least an input stage, an intermediate stage and an output stage, connections existing between the input stage and the intermediate stage, and between the intermediate stage and the output stage, each stage being formed by a certain number of time switches each comprising a certain number of incoming lines and a certain number of outgoing lines, each incoming or outgoing line comprising several time channels and each time channel comprising several binary elements.

6 Claims, 4 Drawing Figures

Patented Aug. 21, 1973 3,754,100

3 Sheets-Sheet 1

MULTI-STAGE TIME CONNECTION NETWORK ARRANGEMENT ADAPTED TO BE USED MORE PARTICULARLY IN TELEPHONE SWITCHING

The invention relates to a high-capacity multi-stage time connection network adapted to be used more particularly in automatic telephone switching and more generally in the industries connected with telecommunications, remote control, remote signalling, etc. The structure of such a network permits of working without blocking: however, it is possible to introduce a certain blocking without changing the basic structure, as will be explained hereinafter.

In time switching, connection networks without blocking are already known of the type which, for example, was the subject of the French Pat. No. 1,511,678 of Dec. 23, 1966, belonging to the Applicants; in this type of connection network without blocking it is always possible, by means of memories, to connect to one another any two time channels of any two network lines or even of the same network line. However, the network capacity is limited by the capacity of the basic module provided for 32 network lines which is not very capable of being increased with the technologies used at present which determine maximum operating rates. Possiblities of increasing the number of the network lines exist by increasing the junction lines and consequently the memories; however, the parabolic rate of increase in the volume of memories in accordance with increase in the number of network lines rapidly becomes prohibitive and in fact limits the network lines to a relatively small number.

In spatial switching also multi-stage connection networks are known without blocking the principle of which is applicable to high-capacity networks. Such non-blocking basic networks with three stages are constituted by an input stage, an output stage and an intermediate stage. It will be assumed that the input stage comprises $n$ input switches each with $n$ inputs and that, likewise, the output stage comprises $n$ output switches each with $n$ outputs. Therefore there is a network with $N = n^2$ inputs and $N = n^2$ outputs. The switches of the intermediate stage are square for reasons of symmetry, relatively to the input stage and the output stage and comprise individually $n$ inputs and $n$ outputs. The number of intermediate switches required for working without blocking determined by reasoning and calculation is $(2n - 1)$. The same three-stage network can also introduce blocking by reducing the number of intermediate switches. Generally, when an input switch has $n$ inputs and $m$ outputs, the number of intermediate switches is $m$, each of them having $n$ inputs and $n$ outputs, and each output switch comprises $m$ inputs and $n$ outputs. Networks requiring more than three stages have an odd number of stages, a total of 5, 7, 9 etc. stages; in the case of a 5-stage network, for example, there is an input stage, an intermediate stage composed of a 3-stage network and an output stage; in the case of a 7-stage network there is an input stage, an intermediate stage composed of a 5-stage network and an output stage; the total number of stages is, therefore, always an odd number and the symmetry of the network is relatively to the central stage of the square intermediate switches with $n$ inputs and $n$ outputs which remains unique whatever the size of the network.

A feature of the invention is to use the structures of multi-stage spatial connection networks for constructing high-capacity time connection networks either without blocking or with blocking depending on the number of intermediate switches.

Also, by analogy with spatial switching, according to the invention the term "time switch" is used to apply to a time connection network with $n$ entering network lines and $m$ outgoing network lines, each network line containing $x$ time channels of $y$ binary elements, for example 32 time channels of 8 binary elements.

According to the invention the term "input switch" (C.E.) of a multistage time connection network is used to designate a time switch whose inputs are incoming network lines and whose outputs are connected to the inputs of the following stage, known as the intermediate stage; similarly, a switch whose inputs are connected to the outputs of switches of the preceding stage, known as the intermediate stage, and whose outputs are connected to the outgoing network lines is called an "output switch" (CS) of a multistage time connection network. The intermediate switch (CI) of a 3-stage time connection network is a switch whose inputs are connected to the outputs of the input switches and whose outputs are connected to the inputs of the output switches.

The invention concerns a time connection network characterized in that it comprises a multi-stage structure comprising at least one input stage, an intermediate stage and an output stage, connections existing between the input stage and the intermediate stage and between the intermediate stage and the output stage, each stage being formed of a certain number of time switches, each time switch comprising a certain number of incoming lines and a certain number of outgoing lines, each entering or outgoing line comprising several time channels and each time channel several binary elements, the internal structure of each time switch, including the switches of the intermediate stage, being such that it permits the allocation of any time channel, of any incoming line of any switch to any time channel of any outgoing line of the same switch so as to permit connecting any time channel of any input switch to any time channel of any output switch, working being effected with or without blocking depending on the number of intermediate switches used.

According to one feature of the invention, each intermediate, output or input time switch has a similar structure, that is to say comprises as many input registers as there are incoming network lines, and the same number of output registers as there are outgoing network lines. Furthermore, each time switch comprises a buffer memory constituted by as many addressable memory blocks as there are incoming lines and a control memory constituted by as many circulation or addressable memory blocks as there are output registers.

According to one feature of the invention, each component memory block either of a buffer memory or of a control memory comprises 32 words corresponding to 32 possible time channels per network line, each word receiving 8 binary elements in the buffer memory and Z binary elements in the control memory (10 binary elements for example).

A 3-stage connection network using square switches and having the same number of switches at each stage constitutes a connection network without blocking provided that the connections are rearranged each time that a blocking occurs.

According to one feature of the invention, in order to establish a connection between an input and an output of a time switch, that is to say between a time channel $t_i$ of an input register (or network line) and a time channel $t_j$ of an output register, it is necessary to, and is sufficient to write in the word of 10 binary elements of control memory associated with the time channel $t_j$ of the output register the address of the buffer memory word associated with the time channel $t_i$ of the input register.

According to the invention, the establishment of a connection in a 3-stage connection network between an input time channel and an output time channel is established by means of three connections, one connection in an input switch, one connection in an intermediate switch and one connection in an output switch; of course the output of the input switch must correspond to the input of the intermediate switch whose output is to correspond to the input of the output switch.

An advantage of multi-stage networks is that they are extensible in modular fashion, that is to say from a fairly small-capacity time switch it is possible to construct a network of substantially unlimitedly large capacity.

Another advantage of multi-stage networks is in their economy as soon as capacity becomes considerable.

Yet another advantage of multi-stage connection networks is in their reliable operation; in fact if an input or output switch has a fault, it is only the circuits connected to these switches whose traffic is canceled; if it is an intermediate switch which has developed a fault, the only result is a certain reduction in traffic.

Finally, another advantage is that of having a structure giving the necessary conditions for obviating blocking and thus permitting constructing in a modular fashion time connection networks without blocking which are of large capacity, this same structure also making it possible, if desired, to introduce blocking by reducing the number of intermediate stages.

The characteristics of the connection network according to the invention will be readily understood from the detailed description which follows of one form of embodiment given solely by way of example and with the aid of the Figures in the accompanying drawings wherein.

Figure 1:
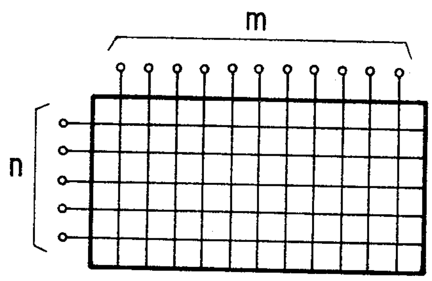
FIG. 1 is a symbolic representation of a time switch.

FIG. 1 shows symbolically a time switch comprising $n$ incoming network lines and $m$ outgoing network lines. Each network line comprises $x$ time channels of $y$ binary elements; for example, each network line comprises 32 time channels of 8 binary elements (e.b.). This "elementary" connection network thus comprises $n$ input registers, $n$ buffer memory blocks of 32 $n$ words of 8 binary elements, or 32 buffer memory words; it also comprises $m$ output registers and 32 $m$ control memory words of $z$ binary elements (for example 10 binary elements if $m - 32$, 5 binary elements addressing one time path from 32, and 5 binary elements addressing one buffer memory block from 32). When $n = m$ the time switch is said to be square, and when $n$ $m$ the time switch is said to be rectangular.

Figure 2:
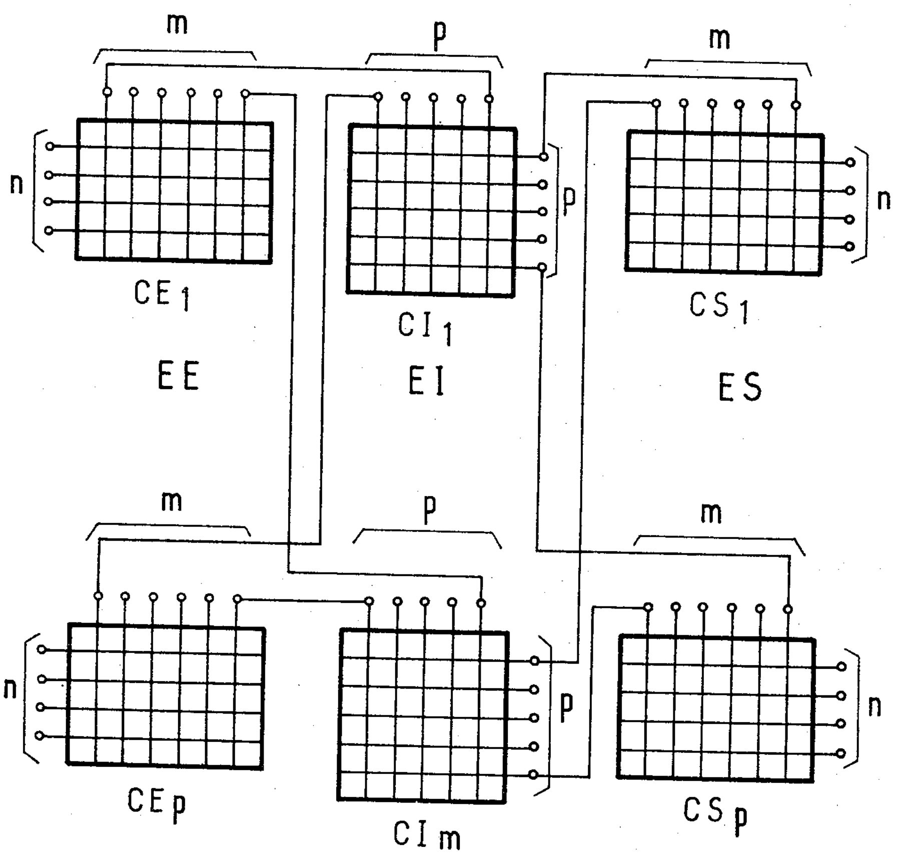
FIG. 2 is a symbolic representation of a 3-stage time connection network.

FIG. 2 shows symbolically a 3-stage connection network. Such a network is composed of an input stage EE, an output stage ES and an intermediate stage EI. The input stage is formed by $p$ input commutators $CE_1$, $CE_2$, $CE_3$ . . . . $CE_p$; each switch comprises $n$ inputs and $m$ outputs; the inputs are incoming network lines and the outputs are connected to the inputs of the following stage or intermediate stage. Each of the outputs $m$ of one and the same input switch is connected to one of the inputs of a switch of the intermediate stage so that to the $m$ outputs of an input switch there correspond $m$ intermediate switches. If any intermediate switch is considered, $CI_1$ for example, each of its inputs is connected to an output of each of the input switches; since there are $p$ input switches, each intermediate switch must therefore comprise $p$ inputs. The same reasoning is valid with regard to the output stage, an intermediate switch is thus square and comprises p inputs and $p$ outputs, or, more generally, the intermediate switch comprises as many inputs as there are input switches and as many outputs as there are output switches. In the 3-stage network according to the invention, the output stage is the symmetrical of the input stage relatively to the intermediate stage and consequently to $np$ entering network lines there correspond $np$ outgoing network lines.

For technological reasons, $p$ is limited, likewise $m$ and $n$: in time connection networks with three stages the maximum capacity in incoming and outgoing network lines is $p_{max} \, x \, n_{max} = n_{max} \, x \, n_{max} = n^2{}_{max}$.

It is known that a connection network without blocking in time switching is a network such that all the communications (or words samples) presented at the input of the network, can be sent towards the desired output register (or outgoing network line). The condition of non-blocking of a 3-stage connection network is the arrangement of a number $(2n - 1)$ of intermediate switches, $n$ being the number of network lines per input switch and the input stage having $n$ input switches. In other words, for $n^2$ incoming network lines it is necessary to have $(2n - 1)$ square intermediate switches with $n$ inputs and $n$ outputs; it is deduced therefrom that the number of outputs of each input switch is $(2n - 1)$ and also that the number of inputs of each output switch is also $(2n - 1)$.

Figure 3:
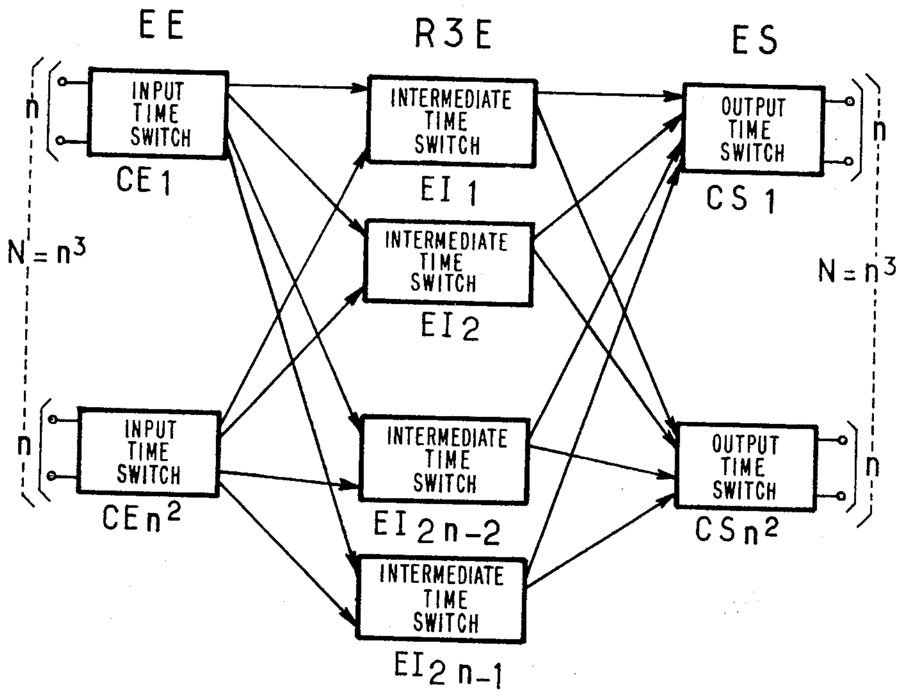
FIG. 3 is a symbolic representation of a 5-stage time connection network.

FIG. 3 shows diagrammatically a 5-stage time connection network. In fact, to increase the capacity of a time network, according to the invention an artifice is resorted to which consists in replacing a switch $CI_1$ of the intermediate stage EI (FIG. 2) by a 3-stage network $EI_1$, the assembly of $(2n - 1)$ intermediate switches of the 3-stage network being replaced by $(2n - 1)$ 3-stage networks $EI_1$; $EI_2$ . . . $EI_{(2n-1)}$; this new intermediate stage R3E thus comprising $(2n - 1)$ times $n^2$ inputs determines the same number $n^2 \, x \, (2n - 1)$ of outputs on the $n^2$ input switches of the input stage EE. Each input switch such as $CE_1$ comprising $n$ inputs, the number of incoming network lines for a 5-stage network is $N = n \times n^2 = n^3$. In symmetrical fashion the output stage comprises $n^2$ output switches such as $CS_1$ and consequently $N - n^3$ outgoing network lines, each incoming or outgoing network line being adapted, of course, to carry $x$ time channels, for example 32 time channels. To exceed the capacity $N - n^3$ it is possible in similar fashion to use instead of each intermediate switch of a 3-stage network an intermediate network of five stages with $n^3$ inputs; thus a network of seven stages altogether will have a maximum capacity of $n^3 \times n = n^4$ network lines. The same procedure would be followed for obtaining networks with 9, 11, etc. stages.

Therefore, if a balance sheet of the equipment used is drawn up, a 5-stage network without blocking requires:

$n^2$ input switches with $n$ inputs and $(2n - 1)$ outputs.

$n^2$ output switches with $(2n - 1)$ inputs and $n$ outputs.

$(2n - 1)$ 3-stage networks as intermediate stage, the 3-stage network without blocking being defined hereinbefore from FIG. 2.

The multi-stage time connection networks without blocking according to FIGS. 2 and 3 can be constructed by assuming the use of two slightly different techniques. One of these techniques, based on the use of an elementary reading time unit in the conversation buffer memories corresponding to a frequency of 8 Mc/s results in a network unit of 32 incoming network lines and 32 outgoing network lines. The second technique is slower and corresponds for example to an operating frequency of 4 Mc/s; this will probably be the case of the MOS technique (metal oxide/semiconductor). In the 8 Mc/s technique since only 32 network lines, incoming or outoing, are treated at a maximum, the input switch will have 16 incoming network lines and 32 outgoing network lines: The output switch will have 32 incoming network lines and 16 outgoing network lines, the intermediate switch will have 16 incoming network lines and 16 outgoing network lines. In the 4 Mc/s technique, since at a maximum only 16 incoming or outgoing network lines are dealt with, the input switch will have 8 incoming network lines and 16 outgoing network lines, the output switch will have 16 incoming network lines and 8 outgoing network lines, the intermediate switch will have 8 incoming network lines and 8 outgoing network lines. On the other hand, a connection network having on the one hand square switches and having the same number of switches at the three stages, a network of this kind constituting a network without blocking provided that there is rearrangement of the connections each time when a blockage occurs, will be constituted: by square switches with 32 incoming network lines and 32 outgoing network lines in an 8 Mc/s technique, and square switches and 16 incoming network lines and 16 outgoing network lines in a 4 Mc/s technique.

Figure 4:
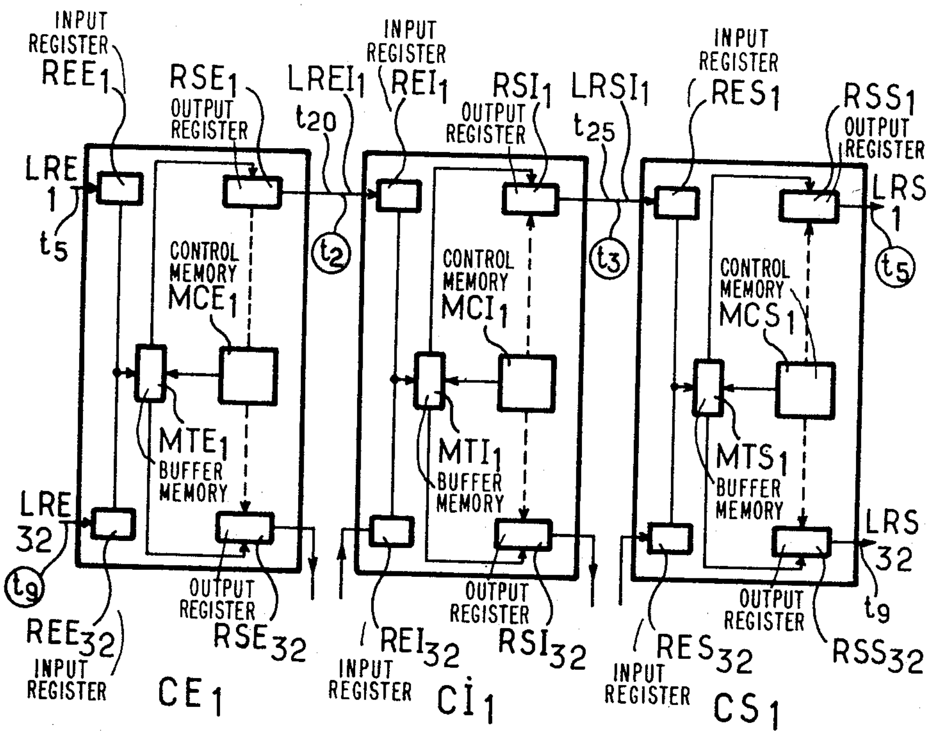
FIG. 4 shows three time switches of a 3-stage connection network according to the invention showing the main components of the time switches.

By way of non-limiting example, FIG. 4 shows three time switches of a 3-stage connection network showing their internal organization. It will be assumed that each time switch, whether an input switch as $CE_1$, an output switch as $CS_{hd\ 1}$ or an intermediate switch such as $CI_1$, comprises 32 incoming network lines and 32 outgoing network lines: therefore, these are square switches.

On the input switch $CE_1$, therefore, 32 input registers $REE_1$, $REE_2$ . . . $REE_{32}$ are found in which terminate respectively the input network lines $LRE_1$, $LRE_2$ . . . $LRE_{32}$.

A buffer memory $MTE_1$ constituted by 32 elementary memories or blocks each comprising 32 words of 8 binary elements; the elementary memories are addressable memories and it will be admitted according to the invention that these are static addressable memories.

A control memory $MCE_1$ comprising 1,024 words as the buffer memory but of 10 binary elements and permitting of addressing one word from 1,024. These 1,024 words also constitute 32 blocks of 32 words, one block being associated with one output register. The control memories may be of two types either addressable or of the word by word circulation type (series parallel memory of 1,024 of 10 binary elements).

32 output registers $RSE_1$, $RSE_2$ . . . $RSE_{32}$ from which start 32 intermediate incoming network lines $LREI_1$, $LREI_2$ . . . $LREI_{32}$ respectively towards the corresponding input registers of the intermediate switches $CI_1$ of the intermediate stage. These connections between the output registers of $CE_1$ and the input registers of $CE_1$ are effected in accordance with the meshes corresponding to the network of FIG. 2.

In a manner similar to the input switch $CE_1$, similar elements are found on the switches $CI_1$ and $CS_1$; thus the input registers $REE_1$ to $REE_{32}$ are respectively replaced by registers $REI_1$ to $REI_{32}$ for the switch $C_1$ and by the registers $RES_1$ to $RES_{32}$ for the switches $CS_1$; likewise, the buffer memory $MTE_1$ is replaced by the buffer memory $MTI_1$ for the switch $CI_1$ and by the buffer memory $MTS_1$ for the switch $CS_1$ etc. . . , an identical structure being used in each of these switches $CE_1$, $CI_1$ and $CS_1$.

In this example, the diagram permits of constructing a connection network of $32 \times 32 = 1{,}024$ incoming and outgoing network lines thus permitting access to 1,024 $\times$ 32 approximately equal to 32,000 circuits, or, provided that there is no blocking, the establishment of 16,000 complete conversation circuits since these are connection of the 4-wire type.

The principle of establishing a connection between an incoming network line and an outgoing network line in a multi-stage time connection network is as follows:

It is assumed that the choice of the incoming network line and the outgoing network line is effected by means externally of the network, in practice by the selector units.

The number of the time channel of the incoming network line and the number of the time channel of the outgoing network line are also assumed to be selected by the selector units.

If the time switch $CE_1$ (FIG. 4) is considered for establishing a connection between a time channel $t_i$ of an input register, for example $REE_1$, and a time channel $t_j$ of an output register, for example $RSE_1$, it is sufficient to write, in the word of 10 binary elements of the control memory $MCE_1$ associated with the time channel $t_j$ of the output register $RSE_1$, the address of the word of buffer memory $MTE_1$ associated with the time channel $t_i$ of the input register $REE_1$. In fact, with each input register of a switch there are associated 32 words of buffer memory corresponding to 32 time channels, and with each output register there are associated 32 control memory words. In this way, the address written in the control memory permits reading from the buffer memory the information emitted at the input and transferring it into the output register, and thus establishing a time connection. If there is then considered a three-stage connection network such as that shown in FIG. 4, a connection between an input time channel and an output time channel is established by means of 3 connections: a connection in an input switch, a connection in an intermediate switch and a connection in an output switch. Of course the output of the input switch must correspond to the input of the intermediate switch whose output should correspond to the input of the output switch.

A numerical example will now be given of a connection through a 3-stage network with reference to FIG. 4.

It will be assumed that the input of the connection network is constituted by the time channel $t_5$ of the network line $LRE_1$ of the input switch $CE_1$ and that the output of the connection network is constituted by the time channel $t_9$ of the network line $LRS_{32}$ of the output switch $CS_1$.

The intermediate switch $CI_1$ is used and, in this switch, a time channel of the input register $REI_1$, and a time channel of the output register $RSI_1$ for example respectively the time channels $t_{20}$ and $t_{25}$. It follows that the time channels $t_{20}$ of the register $RSE_1$ of the switch $CE_1$ and $t_{25}$ of the register $RES_1$ of the switch $CS_1$ will also be used.

The complete connection is effected by the writing:

in the control memory $MCE_1$ and in the word No. 20 of the block of 32 words associated with $RSE_1$, of the address of the word No. 5 ($t_5$) of the block of 32 buffer words associated with $REE_1$.

in the control memory $MCI_1$ and in the word No. 25 of the block of 32 words associated with $RSI_1$, of the address of the word No. 20 of the block of 32 buffer words associated with $REI_1$.

in the control memory $MCS_1$ and in the word No. 9 ($t_9$) of the block of 32 words associated with $RSS_{32}$, of the address of the word No. 25 of the block of 32 buffer words associated with $RES_1$.

It can be remarked that since it is effected in a time switch, the transfer of an input towards the connected output at each sampling period T will require 3 periods T for transferring an item of information from an input to an output of the 3-stage time network.

The establishing of a telephonic time communication requires two connections through the connection network, one from the calling subscriber to the called subscriber, the other from the called subscriber to the calling subscriber.

Of course, these two connections are not independent: in fact, the subscriber modulation equipment being sampled at the same time at the transmission side and the reception side, the coded signal to be transmitted by a subscriber towards his correspondent and the coded signal to be received from the correspondent must be present at the same time in the modulation equipment of the subscriber. Therefore, the sampling time channel number of a calling subscriber determines the time channel number on the incoming network line (LRE) of the connection towards the called subscriber and also the time channel number on the outgoing network line (LRS) of the called connection towards the caller. It will be understood that if delays in transmission between the connection network and the subscriber modulation equipments were mil, the two time channels would have the same number and this is what will be supposed in the numerical example which follows; in fact, there is a constant difference between the time channel on the LRE and the time channel on the LRS of the two connection directions, so that if one of the time channels is known the other will be deduced easily by addition or subtraction of a constant.

The numerical example explained hereinbefore concerning the connection through a 3-stage connection network corresponds to the connection caller-to-called; this example will be completed by the connection called-to-caller.

This latter connection will be established between the time channel $t_9$ of $LRE_{32}$ (FIG. 4) of the switch $CE_1$ and the time channel $t_5$ of $LRS_1$ of the switch $CS_1$. The intermediate switch $CI_1$ will be used and in this switch the time channel $t_2$ of $REI_1$ and the time channel $t_3$ of $RSI_1$ for example, assuming that the time channels are unoccupied (these time channels will be represented as circled in FIG. 4).

The connection is effected by writing:

into the control memory $MCE_1$ and into the word No. 2 in the block of 32 words associated with $RSE_1$, the address of the word No. 9 of the block of 32 buffer words associated with $REE_{32}$.

into the control memory $MCI_1$ and in the word No. 3 of the block of 32 words associated with $RSI_1$, the address of the word No. 2 of the block of 32 buffer words associated with $REI_1$.

into the control memory $MCS_1$ and in the word No. 5 of the block of 32 words associated with $RSS_1$, the address of the word No. 3 of the 32 buffer words associated with $RES_1$.

In a multi-stage network, of the same type as that which has just been described, the act of being able to send speech-frequency tones or signals uses only the output switches CS. It will be assumed that the number of signals and tones is less than 32 and that the signals are available in the form of pulse-code modulation (MCI), as word signals, at the input of the connection network and supplied by a means externally of the network. Each output switch CS will then have a 33rd incoming network line, that is to say a 33rd register $RES_{33}$ and a 33rd buffer memory block of 32 words where there are recorded at each sampling period successive periodic codes of the 32 speech-frequency signals.

To send a signal or tone "$j$" towards a subscriber connected to an output register $RSS_n$ during the time channel $t_i$, it is sufficient to record in the control memory of the switch at the word No. 1 of block No. $n$ of the 32 words associated with register $RSS_n$, the number "$j$" of the buffer memory word allocated to this tone in the block of 32 words associated with the register $RES_{33}$.

Of course, the invention is in no way limited to the form of embodiment described and illustrated which has been given only by way of example. More particularly it is possible, without departing from the framework of the invention, to modify certain arrangements or replace certain means by equivalent means.

What I claim is:

1. A time division multiplex connection system comprising a multistage network including at least one input stage, one intermediate stage, and one output stage, each stage consisting of a certain number of time switches, each switch of the input stage comprising a certain number of inputs connected to incoming multiplex lines, as many outputs as there are switches at the next-following intermediate stage, each output being connected with a different switch of said intermediate stage, each switch of an intermediate stage comprising as many inputs as there are switches at the stage which precedes it, each input being connected with a different switch of the preceding stage and as many outputs as there are switches at the next-following stage, each output being connected with a different switch of the next-following stage, each switch of the output stage comprising a certain number of outputs connected to outgoing multiplex lines, and as many inputs as there are switches at the stage which precedes it, and each input being connected with a different switch of the preceding stage, the switches of two stages which follow each other being interconnected by means of intermediate multiplex lines, wherein each time switch is composed of input means receiving a plurality of time channels on said incoming multiplex lines, output means for applying said plurality of time channels on the multiplex lines of said outputs, and memory means for transferring said time channels from said input means to said output means, wherein said memory means includes control means for transferring a given time channel on one input line to a different time channel on an output line of the associated switch, and wherein the time channels at the input and at the output of a time switch established for one communication are maintained for the entire duration of said communication.

2. A time division multiplex connection system as defined in claim 1, wherein said network comprises only three stages, an input stage comprising $p$ input switches with $n$ inputs and $m$ outputs, an intermediate stage comprising $m$ intermediate switches with $p$ inputs and $q$ outputs, an output stage comprising $q$ output switches with $m$ inputs and $n$ outputs, each input switch receiving $n$ incoming network lines with $x$ time channels and its $m$ outputs being connected to respective inputs of the $m$ intermediate switches, each output switch having $n$ outgoing network lines with $x$ time channels, the $m$ inputs of each output switch being connected to the outputs of the $m$ intermediate switches, the $p$ inputs and $q$ outputs of each intermediate switch being thus respectively connected to the $p$ input switches and the $q$ output switches so that the network thus determined comprises $n^2$ incoming lines and $n^2$ outgoing lines, whereby a connection is possible between any time channel of the $n^2$ incoming network lines and any time channel of the $n^2$ outgoing network lines, the suppression of blocking in the traffic depending on the number $m$ of switches of the intermediate stage.

3. A time division multiplex connection system according to claim 1, with three stages, the input stage comprising $n$ switches with $n$ inputs and $(2n-1)$ outputs, the intermediate stage comprising $(2n-1)$ switches with $n$ inputs and $n$ outputs and the output stage comprising $n$ switches with $(2n-1)$ inputs and $n$ outputs, some of said time division multiplex connections existing between the $(2n-1)$ outputs of each input switch and the inputs of the $(2n-1)$ intermediate switches and other of said time division multiplex connections existing between the $(2n-1)$ inputs of each output switch and the $(2n-1)$ intermediate switches so as to form a time connection network without blocking having $n^2$ incoming network lines and $n^2$ outgoing network lines.

4. A time division multiplex connection system according to claim 1, wherein each of the stages comprises the same number $n$ of square switches with $n$ inputs and $n$ outputs so that the system constitutes a connection network without blocking having the connections rearranged without interrupting them each time that a blocking occurs.

5. A time division multiplex connection system according to claim 1, wherein each time switch comprises a plurality of input registers equal in number to the number of incoming network lines to the switch, a plurality of output registers equal in number to the outgoing network lines from the switch, each incoming and outgoing network line comprising 32 time channels, a buffer memory operatively associated with the incoming network lines and constituted by as many addressable memory blocks as there are incoming network lines to store data therefrom, each block comprising 32 words of $y$ bits corresponding to 32 time channels, a control memory operatively associated with the outgoing network lines and constituted by as many memory blocks as there are outgoing network lines, each block comprising 32 words of Z bits corresponding to the 32 time channels so that the establishment of a connection between a time channel $t_i$ of an input register and a time channel $t_j$ of an output register is effected by means in said control memory writing in the word of z control memory bits associated with the time channel $t_j$ of the output register allocated to the $n$th outgoing network line the address of the buffer memory word associated with the time channel $t_i$ of the input register allocated to the $m$th incoming network line.

6. A time division multiplex connection system as defined in claim 1, wherein each time switch comprises a plurality of input registers equal in number to the number of incoming network lines to the switch, a plurality of output registers equal in number to the outgoing network lines from the switch, a buffer memory including an individual memory portion for each input register having a plurality of time channels equal in number to the time channels provided by each incoming network line, a control memory having an addressable memory block corresponding to each output register, each memory block having a plurality of time channels equal in number to the time channels provided by each outgoing network line, said control memory including means for transferring data in one time channel in said buffer memory to a different time channel of one of said outgoing network lines in accordance with the address of the input register and time channel thereof stored in the memory block corresponding to the required output register and the time channel of the memory block corresponding to the time channel of the outgoing network line to be used.

* * * * *